(12) United States Patent  
Northrop et al.

(10) Patent No.: US 9,974,279 B2  
(45) Date of Patent: May 22, 2018

(54) PET WATERING AND FEEDING DEVICE

(75) Inventors: Melaney Northrop, Mansfield, TX (US); Michael D. Harper, Fort Worth, TX (US); David R. Veness, Fort Worth, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 1034 days.

(21) Appl. No.: 13/293,915

(22) Filed: Nov. 10, 2011

(65) Prior Publication Data

US 2012/0125263 A1    May 24, 2012

Related U.S. Application Data

(60) Provisional application No. 61/412,239, filed on Nov. 10, 2010.

(51) Int. Cl.
*A01K 5/01* (2006.01)
*A01K 5/02* (2006.01)
*A01K 7/00* (2006.01)

(52) U.S. Cl.
CPC .......... *A01K 5/0114* (2013.01); *A01K 5/0225* (2013.01); *A01K 7/00* (2013.01)

(58) Field of Classification Search
CPC ....... A01K 5/0225; A01K 5/0114; A01K 7/00
USPC ............... 119/51.5, 52.1, 56.1, 61.54, 72, 74
See application file for complete search history.

(56) References Cited

U.S. PATENT DOCUMENTS

| | | | | | |
|---|---|---|---|---|---|
| 4,840,143 | A | * | 6/1989 | Simon | A01K 5/0225 |
| | | | | | 119/52.1 |
| 5,259,336 | A | * | 11/1993 | Clark | 119/51.5 |
| 6,055,932 | A | * | 5/2000 | Weber | A01K 5/0114 |
| | | | | | 119/52.1 |
| 6,477,981 | B1 | * | 11/2002 | Harper | 119/52.4 |
| 7,040,249 | B1 | * | 5/2006 | Mushen | 119/51.5 |
| 8,186,304 | B2 | * | 5/2012 | Harper | 119/74 |
| 8,448,603 | B2 | * | 5/2013 | Northrop et al. | 119/61.54 |
| 8,555,816 | B2 | * | 10/2013 | Weber et al. | 119/74 |
| 2006/0196433 | A1 | * | 9/2006 | Ness | 119/52.1 |
| 2006/0231040 | A1 | * | 10/2006 | Bast | A01K 7/005 |
| | | | | | 119/77 |

* cited by examiner

*Primary Examiner* — Joshua D Huson  
(74) *Attorney, Agent, or Firm* — Global IP Counselors, LLP (57) ABSTRACT

A nutrient dispensing device for animals includes an access basin and a support portion attached to the access basin. The dispensing device includes a ramp spanning between the access basin and the support portion. A storage tank is disposed on the support portion, and a first end of the ramp is located partially beneath an open end of the storage tank. The ramp also includes at least one shield attached along a portion of the ramp, and the shield resists contents stored in the storage tank from entering a region of the support portion.

13 Claims, 11 Drawing Sheets

PET WATERING AND FEEDING DEVICE

CROSS-REFERENCE TO RELATED APPLICATION

This application claims priority from U.S. Provisional Patent Application Ser. No. 61/412,239 entitled "Pet Watering and Feeding Device" filed Nov. 10, 2010, the disclosures of which are incorporated herein by reference.

FIELD OF THE INVENTION

The present invention relates to pet feeding and watering apparatuses. More specifically, the present invention relates to a combination feeding and watering device.

BACKGROUND OF THE INVENTION

Animal feeding and watering devices that have a storage area and a feeding bowl may allow animal food to become clogged or compacted within an area between the storage area and the feeding bowl. This may be because some animal food includes kibbles having square, triangle, rectangular, and other shapes that may stick to each other when traveling between the storage area and the feeding bowl. Additionally, many storage/gravity watering bowls cannot also function as feeding bowl. This may be because in order to have water travel from the storage area to the bowl without overfilling the bowl, the end of the water storage tank needs to be submerged within the water. On the other hand, in order for food to travel from the storage tank to the bowl there may need to be a ramp or other displacement apparatus, or else the food may just fall in a pile underneath the storage opening without traveling to the feeding bowl.

BRIEF SUMMARY OF THE INVENTION

Certain embodiments take the form of a nutrient dispensing device for animals including an access basin and a support portion attached to or disposed on the access basin. The dispensing device includes a ramp spanning between the access basin and the support portion. A storage tank is connected to or disposed on the support portion, and a first end of the ramp is located adjacent and partially beneath an open end of the storage tank. The ramp also includes at least one shield attached situated a portion of the ramp, and the shield resists contents stored in the storage tank from entering a region of the support portion.

Other embodiments include a basin for holding edible contents. The basin includes a first bowl having a substantially planar bottom and a second bowl attached to the first bowl. Also, a ramp extends between the first bowl and the second bowl. The second bowl includes at least one extension protruding from an inner wall of the second bowl and a supporting wall disposed on a bottom of the second bowl, the supporting wall begin connected with a first end of the ramp. The second bowl also includes a top shield disposed at the first end of the ramp, as well as a side shield disposed at a side portion of the ramp, the side shield substantially resisting communication between the second bowl and the first bowl.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION

Disclosed herein is a pet nutrient dispensing device that may be used for either liquids or solids, e.g. either water or food. The device may include a base or bottom bowl/basin having a ramp along a bottom portion. The base may include an access portion that may be open, allowing an animal access to the contents and a second portion that may be used to attach to and support a storage tank. The storage tank may be mounted over a portion of the ramp and can be used to store nutrients, such as water, food and the like. The device may also include a cover or lip to resist the nutrients from leaking from the storage tank to outside of the bottom bowl. Furthermore, the ramp may be adequately angled to allow for the storage tank to hold either liquids or solids and allow both types of nutrients to be dispensed into the base. The ramp may include a wall or shield surrounding a top portion to resist nutrients from falling off of the ramp and into the second portion of the bowl. The second portion of the bottom bowl may also have a barrier wall to resist nutrients stored in the first portion, or nutrients traveling along the ramp, from being dispensed behind the ramp. The ramp further may include a partially flat landing surface that may align beneath an opening of the storage tank. In these embodiments, if the storage tank contains water or other liquids, the opening of the tank may be able to be sufficiently submerged to allow the bottom bowl to be filled with liquids without overfilling the bottom bowl. Additionally, the ramp includes a sufficiently steep drop into the first portion of the bottom bowl such that solid nutrients are not prevented from being deposited in the first portion.

A pet nutrient dispenser 10 has a base 11 that includes an access basin 12 and a support portion 30. A storage tank 16 may be secured to a top of the support portion 30 of the base 11. A collar 18 may be secured around a bottom area of the storage tank 16 where it connects to the base 11. A ramp 20 may be attached to or integrated with a surface on the bottom of the base 11, and a top portion of the ramp 20 may be located adjacent and beneath an opening of the storage tank 16.

Figure 6:
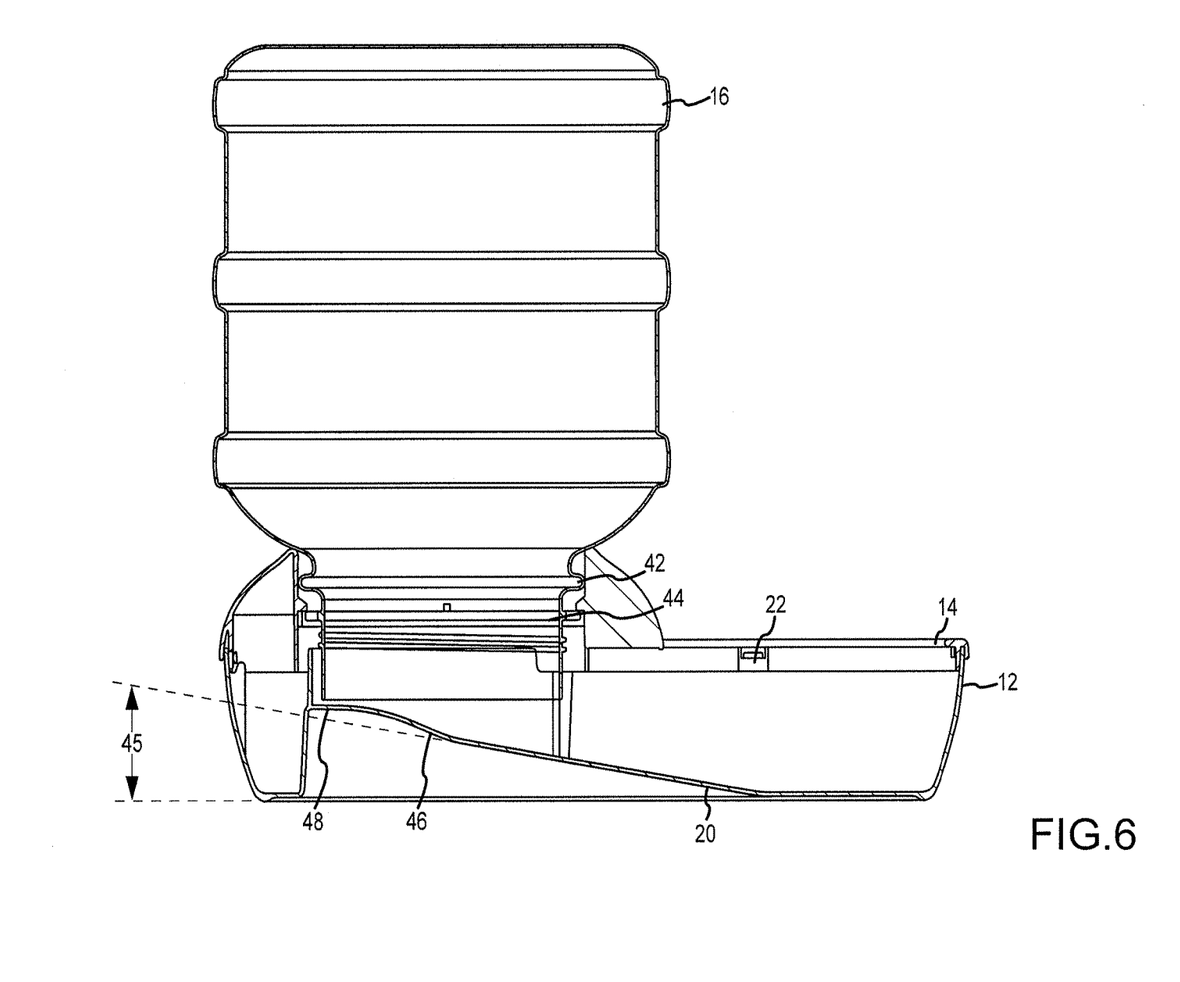
FIG. 6 is a partially cut away side elevation view of the nutrient dispensing system.
Figure 10:
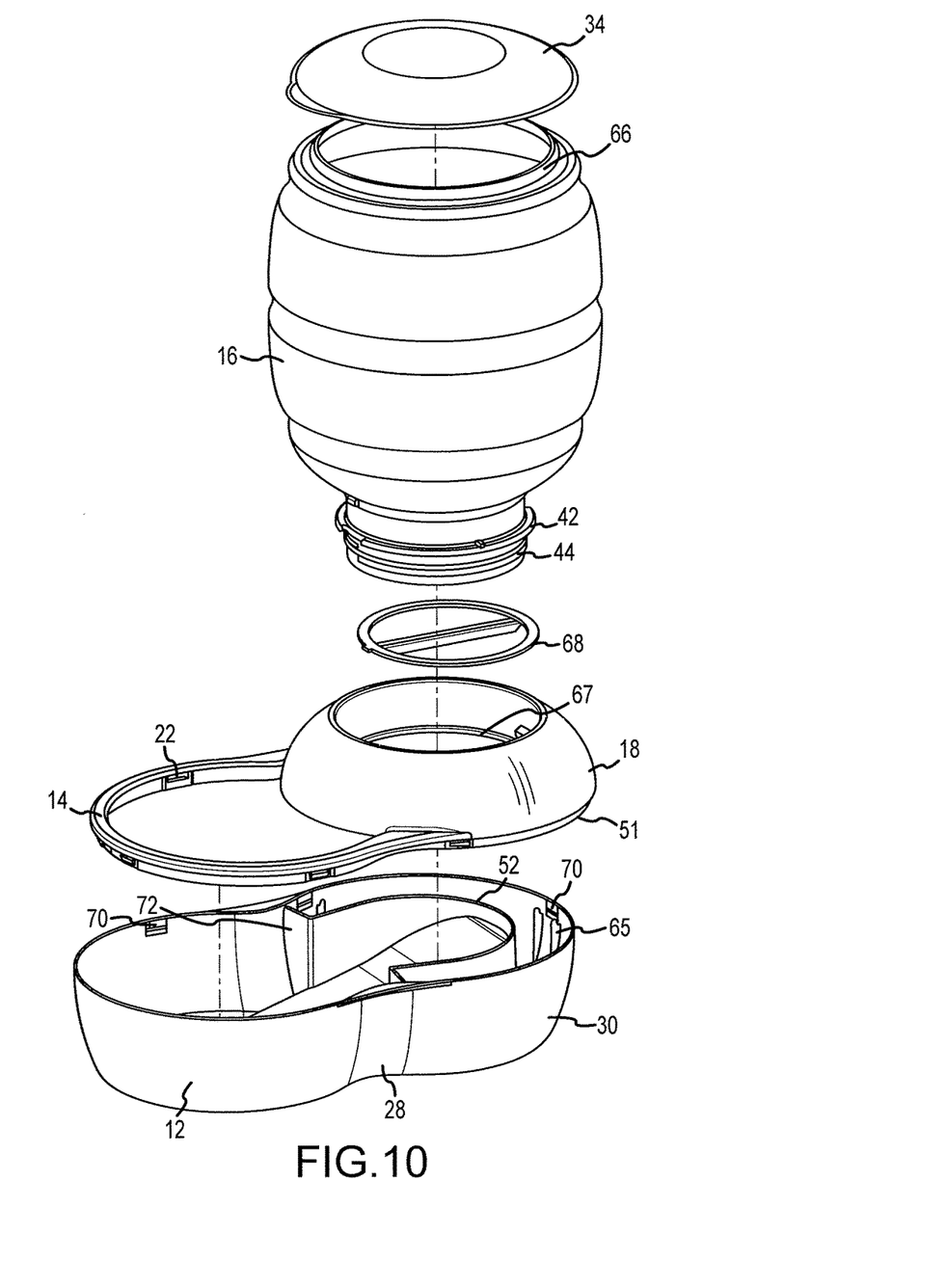
FIG. 10 is an exploded isometric view of the pet nutrition system that includes a storage tank having an alternative appearance.

The storage tank 16 holds food, water and other nutrients to be provided to the animal. The storage tank 16 may be substantially cylindrical shaped and generally hollow. It should be noted that the storage tank 16 may be designed in any appropriate shape, and the cylindrical design is merely one embodiment. Additionally, the storage tank 16 may be constructed out of a flexible material, such as plastic, or other appropriate material. In some embodiments, the storage tank 16 may be formed from a preform blowing process, however in other embodiment the storage tank 16 may be formed in any other suitable method. The storage tank 16 may contain a channel/opening or be in fluid communication with or otherwise connected to base 11 via the neck 44 (FIG. 6). The storage tank 16 and the base 11 are attached via complementary threading on the neck 44 and on the collar 18. As shown in FIG. 10, which is an exploded view of the dispenser 10 having a storage tank 16 with an alternative appearance, the collar 18 may contain threading 67 along an inner surface. The storage tank 16 and the base 11 may be connected together to resist leaks as the nutrients travel between the storage tank 16 and base 11.

Referring again to FIGS. 1 and 2, the base 11 supports the storage tank 16 and provides a feeding/watering area for pets using the nutrient dispenser 10. The base 11 includes the access basin 12 and the support portion 30. In some embodiments the access basin 12 and the support portion 30 are a unitary piece, meaning that it is a single-piece element, however in other embodiments the access basin 12 and the support portion 30 may be formed from two separate pieces. Similarly, in some embodiments the base 11 may be shaped as a figure eight, and the access basin 12 and the support portion 30 may each be circular or cylindrically shaped. In these embodiments, the access basin 12 and the support portion 30 may be substantially the same diameter, however in other embodiments the access basin 12 and the support portion 30 may have different diameters. Also, the access basin 12 and the support portion 30 may have corresponding shapes or may have different shapes. For instance the support portion 30 may be square whereas the access basin 12 may be circular, or vice-versa. The base 11 may vary in size based on the type or size of the animal for which the nutrient dispenser 10 may designed to be used. For example, some large animals may require more nutrients, and so the base 11 (and other portions of the nutrient dispensing system 10) may be larger than if the dispenser 10 is to be used for relatively smaller animals.

Figure 9:
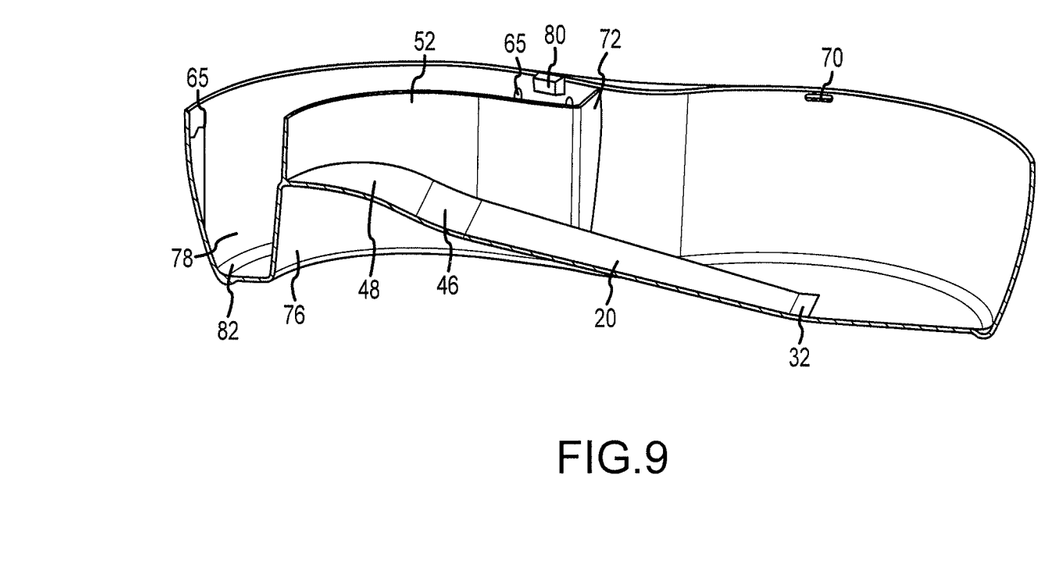
FIG. 9 is a sectional view as taken along line 9-9 in FIG. 7.

The access basin 12 includes a wall 24 surrounding its perimeter. The wall 24 helps to contain the nutrients after they have been dispensed from the storage tank 16 into the access basin 12. The wall 24 may vary in height but is high enough to substantially contain the nutrients while also low enough to allow pets access to the nutrients. The size of the wall 24 may be altered in order to accommodate different sizes and types of pets. For example, for small dogs and/or cats the wall 24 may be quite low as the smaller breeds may not require as much food/water as larger animals and also have shorter legs than larger animals. However, if the pet nutrient dispenser 10 is designed for larger animals, the wall 24 may be higher to hold more food/water and also as the larger animals have longer legs and may more easily access the nutrients over a higher wall 24. Referring briefly to FIG. 9 illustrating a cross sectional view of the base 11 viewed along line 9-9 in FIG. 7, the wall 24 may include securing apertures 70 located at a top portion of the wall 24. The securing apertures 70 may be used to secure a rim 14 to the base 11. The securing apertures 70 may be spaced anywhere along the wall 24, and there may be any number of securing apertures 70 as may be necessary to secure the rim 14 to the base 11. In some embodiments the securing apertures 70 may be omitted, for instance, if the rim 14 is not included on the base 11.

The ramp 20 may extend into the access basin 12 of the base 11. As nutrients flow down the ramp 20 from the storage tank 16, they are deposited in the access basin 12. As the access basin 12 becomes full with nutrients, the nutrients may be resisted from sliding down the ramp 20. When this occurs, the static angle of repose of the nutrients on the ramp may resist more nutrients from exiting the storage tank 16, helping to ensure that the access basin 12 does not overflow.

Figure 1:
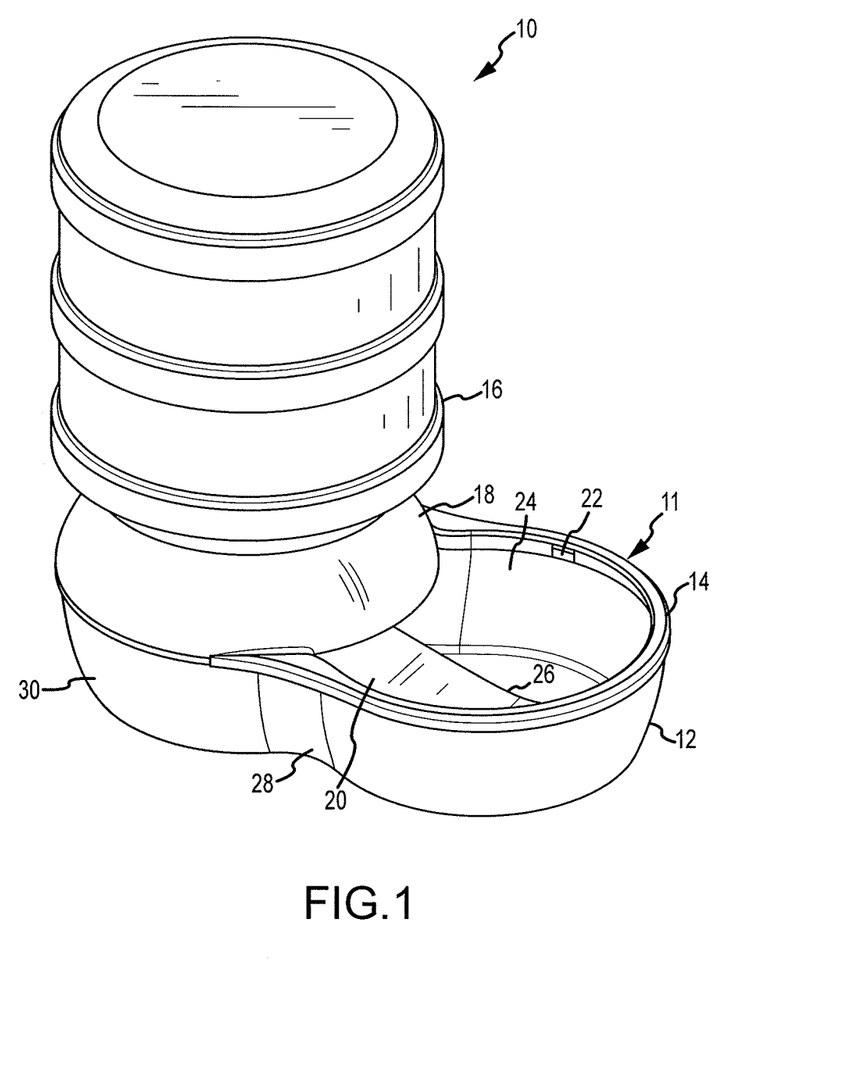
FIG. 1 is a side view of a nutrient dispensing system.
Figure 2:
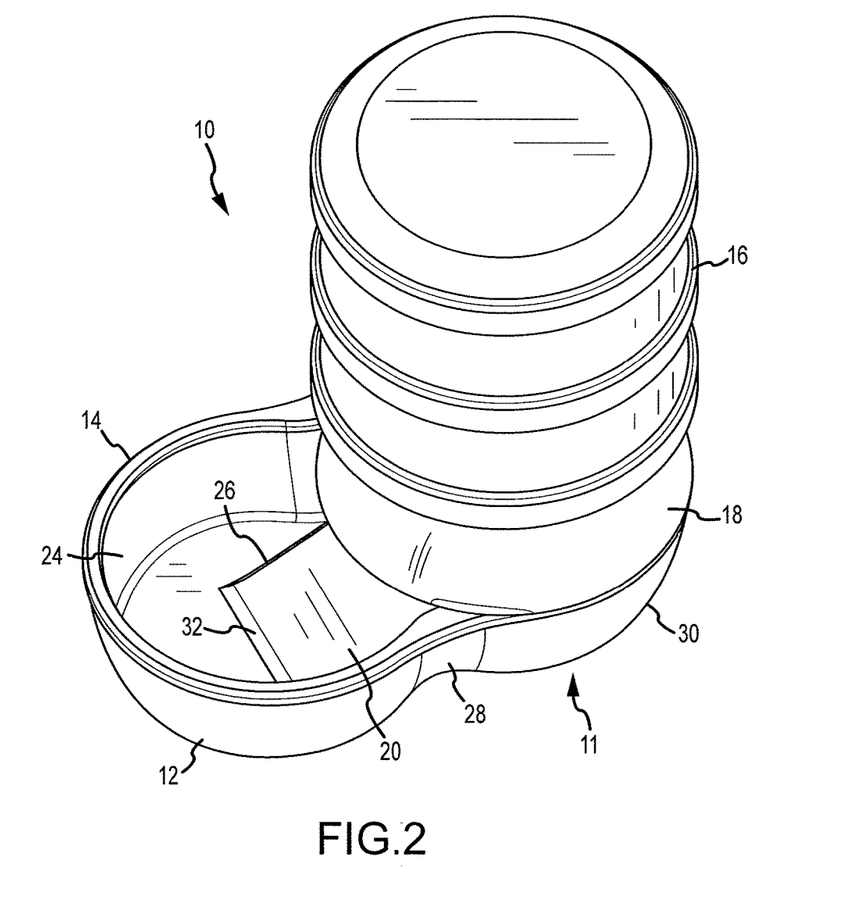
FIG. 2 is a top view of the nutrient dispensing system.
Figure 3:
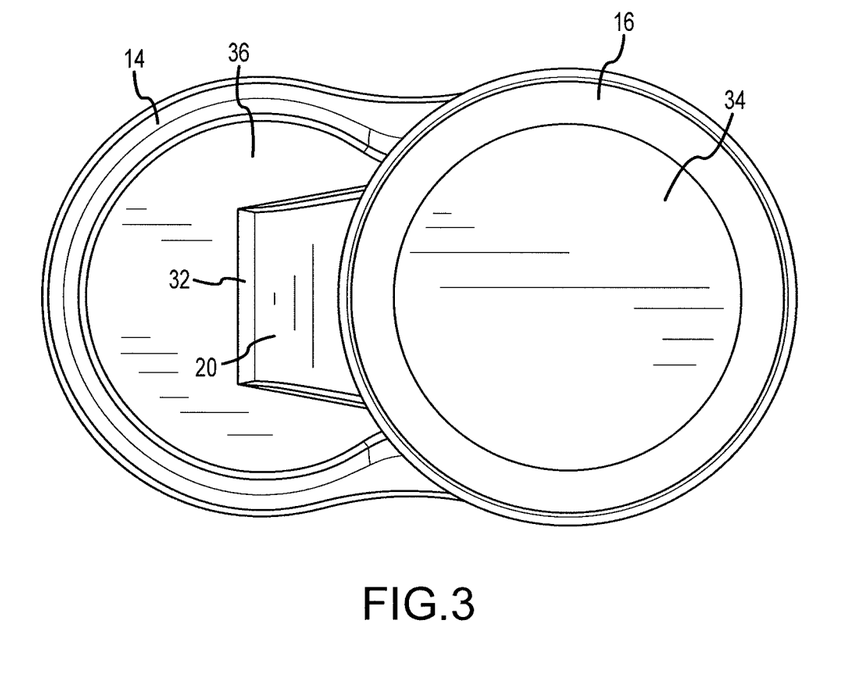
FIG. 3 is another top view of the nutrient dispensing system.
Figure 7:
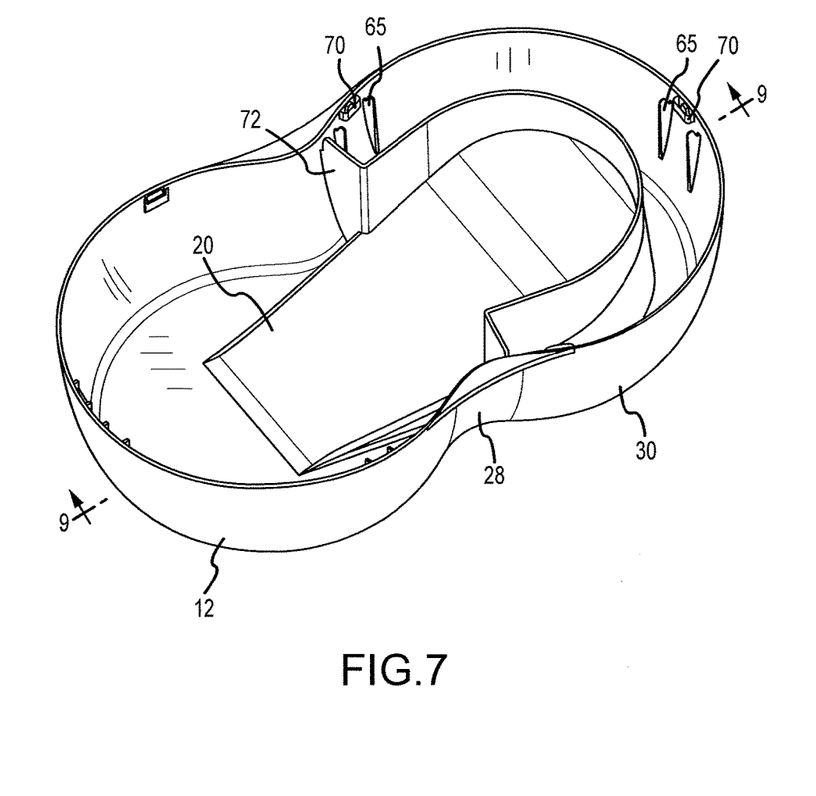
FIG. 7 is a top view of a base of the nutrient dispensing system.

As can be seen from FIGS. 1-3, in some embodiments the ramp 20 may extend from support portion 30 to the access basin 12 of the base 11. Referring now to FIGS. 1, 6 and 7, the ramp 20 slopes between the access basin 12 and the support portion 30. The ramp 20 distributes and transmits nutrients from the storage tank 16 to the access basin 12.

The ramp 20 may include a landing area 48 at a top portion of the ramp 20, and the landing area 48 may be integrated with a middle section 46. The landing area 48 may be partially flattened, and the middle section 46 may connect the sloping ramp 20 to the flattened landing area 48. In these embodiments, the neck 44 of the storage tank 16 may be able to be submerged in water when the dispensing device 10 is used for liquids. In these embodiments, the dispensing device 10 may be able to be used for either solids nutrients or liquid nutrients (which may include water). This is because in order to avoid overfilling the access basin 12 with liquid, the neck 44 is submerged within a liquid whose level may be roughly proportional to the amount of liquid in the access basin 12. The submerged neck 44 may then act to balance the pressures, so that more liquid does not flow from the storage tank 16 to the access basin 12 when the liquid level reaches a threshold level. The balanced pressures avoids fluids overflowing the access basin 12, as well as enabling the access basin 12 to be adequately filled to provide enough fluid for the animal.

As shown in FIG. 6, the neck 44 may be disposed slightly above the landing portion 48 of the ramp, such that when the storage tank 16 is holding liquids the neck 44 may be substantially submerged in liquid when the access bowl 12 and the storage tank 16 are full. The height that the neck 44 is located above the landing portion 48 may be adjusted in order to alter the fill level of the access basin 12. The higher the neck 44 is from the landing portion 48, the more full the access basin 12 will be when the storage tank 16 is full. Additionally, as the neck 44 in some embodiments may be submerged in water or liquid, an O-ring or other type of fluid seal may be omitted. This is because if the storage tank 16 or the connection between the storage tank 16 and the collar 18 leaks, liquids may simply flow into the base 11.

As the dispenser 10 may be used for solids and liquids, the ramp 20 includes a sloping portion after the landing area 48. Additionally, although the landing area 48 is partially flattened, it may still include a slight slope, but the sloping angle is less-steep than at other areas of the ramp 20. These embodiments allow solid food/nutrients to be dispensed into the access basin 12 without piling up beneath the opening of the storage tank 16. Also, in some embodiments, the liquid level for the access basin 12 may be set to be approximately ¼ inch below a top of the rim 14. In these embodiments, the ramp 20 may be oriented at an angle in the range of approximately 20 to 25 degrees. For example, referring to FIG. 6, the ramp 20 may be sloped in the range of approximately 20 to 25 degrees between a bottom of the base 11 and the top of landing area 48. When the angle 45 is set to be in the range of approximately 20 to 25 degrees, solid nutrients may better be able to flow down the ramp 20, and may be able to avoid getting stuck. In embodiments where the ramp 20 angle 45 is set to be less than 20 to 25 degrees, solid foods potentially may become stuck or clogged along the ramp 30 and may not adequately flow between the storage tank 16 and the access basin 12. The angle 45 may be altered depend depending on the desired water level, and the ramp 20 may be set to a variety of different angles.

In some embodiments, the ramp 20 includes an end piece 32 integrating the ramp 20 into the base of the access basin 12. The ramp 20 may also include sidewalls 26 along at least a portion of the length of the ramp 20. The sidewalls 26 may help to prevent nutrients from sliding off the sides of the ramp 20 and direct the nutrients to the end piece 32 and thus the bottom of the access basin 12. Also, referring now to FIGS. 4 and 8, the ramp 20 may be narrower at the access basin 12 than at the support portion 30. In some embodiments the ramp 20 may be as wide as a connecting neck 28 that connects together the access basin 12 and the support portion 30. An access shields 72 is attached to the ramp 20, and the support portion 30 may be placed behind the ramp 20. In these embodiments, nutrients such as solid foods may avoid becoming clogged at the connecting neck 28.

In addition to the access shields 72, a back portion of the ramp 20 may be lined with a back shield 52. The back shield 52 may be an extension of a supporting wall 76. The back shield 52 and the access shields 72 resist nutrients from being deposited in the back area 78 of the supporting portion 30. The access shields 72 and the back shield 52 help ensure that as nutrients are deposited on the landing area 48 and travel down the ramp 20 they do not get suck behind the ramp 20 in the support portion 30. Also, the back shield 52 may curve around the back end of the ramp 20 and help to guide the nutrients towards the access basin 12. In some embodiments the collar 18 covers the distance between the back wall 78 of the support portion 30 and the back shield 52 such that nutrients are resisted from entering the support portion 30 via the storage tank 16.

As the shields 52 and 72 resist nutrients from becoming stuck in the supporting portion 30, they alleviate the need for the second portion 30 to be cleaned as frequently. Furthermore, the shields 52 and 72 resist nutrients from becoming unavailable to the animal. For example, as the collar 18 may substantially prevent an animal from accessing some areas of the supporting portion 30, the shields 52, 72 resist nutrients from becoming deposited in areas that are inaccessible to the animal.

Figure 11:
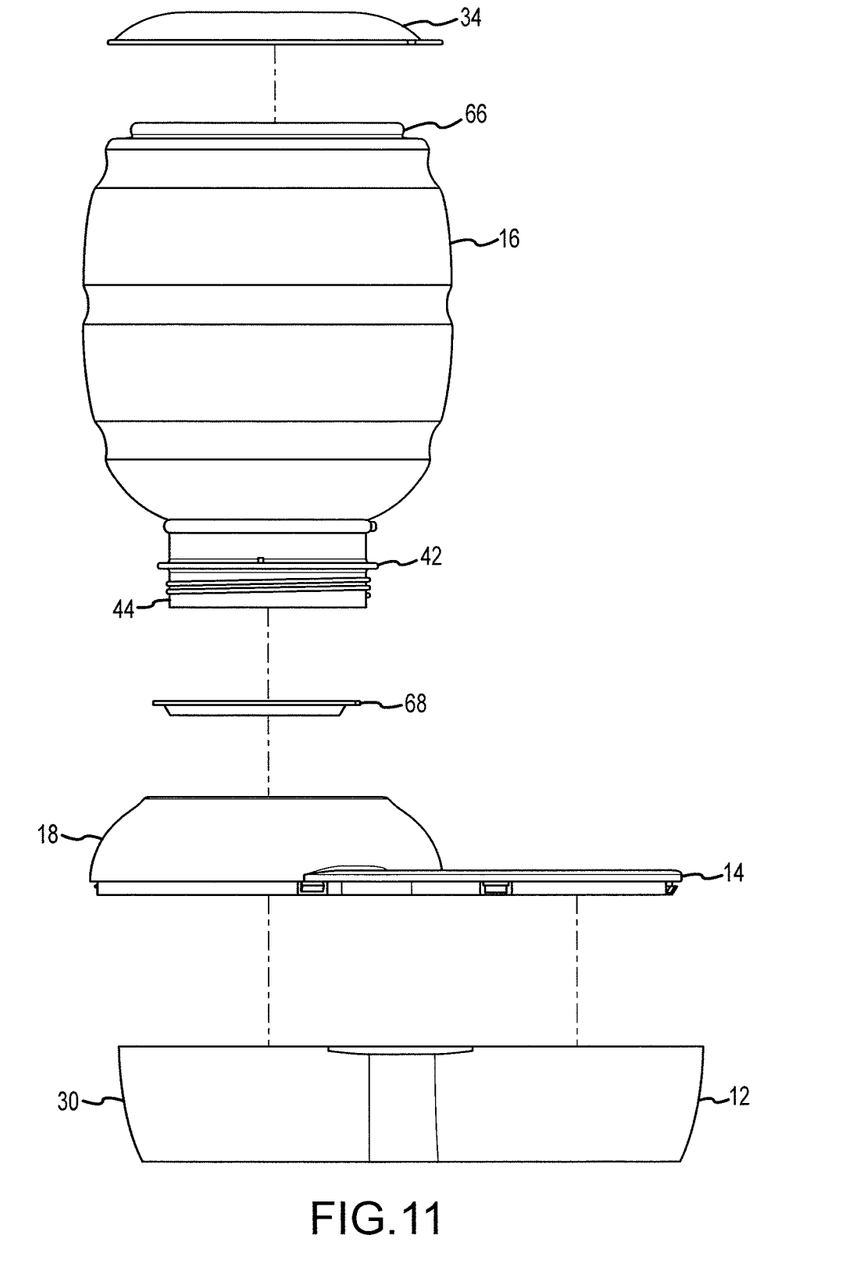
FIG. 11 is an exploded elevation view of the pet nutrition system that includes the storage tank having the alternative appearance.

FIGS. 10 and 11 illustrate exploded views of the dispensing device 10, with the storage tank 16 having an alternative appearance than that depicted elsewhere herein. Referring to FIGS. 10 and 11, the storage tank 16 holds the nutrients and is disposed on the supporting portion 30 of the base 11. The storage tank 16 includes a hollow neck 44 having a passageway for the nutrients. As described above, the height of the neck above the landing portion 48 controls the fill level of the access basin 12, for both liquids and solids. The neck 44 may include threading 42 or other types of attachment mechanisms, to attach the storage tank 16 to the base 11 and/or collar 18. The neck 44 of the storage tank 16 may be concealed via the collar 18. In this embodiment the inner connections, i.e., the threading 42 and fluid passageway, may be hidden from view thereby providing a more refined appearance. Furthermore, the collar 18 may help to prevent splashing/spilling as the nutrients exit the storage tank 16 and enter the base 11.

The storage tank 16 may also include a safety ring 68 disposed at a distal end of the neck 44. The safety ring 68 may be located between the neck 44 and the collar 18. The safety ring 68 may snap fit or otherwise be connected to the collar 18 via the threading 67 or may be connected directly to the storage tank 16. The safety ring 68 may help to avoid animals utilizing the dispensing device 10 placing their head or other appendages inside the storage tank 16. In some embodiments the safety ring 68 may be omitted, and in other embodiments the storage ring 68 may be a screen or other device that may allow the nutrients to flow between the storage tank 16 and the base 11 while avoiding an animal from accessing the storage tank 16.

In some embodiments a filter may be disposed between the base 11 and the storage tank 16. For instance, if the dispensing device 10 is to be used as a watering device for animals a water filter may be included between the storage tank 16 and the base 11.

The storage tank 16 in some embodiments may also include a cap 34 located at a top portion of the storage tank 16. The cap 34 may be secured to the storage tank 16 via a snap fit or via threading 66 located on the top area of the storage tank 16. The cap 34 may be removed to allow a user to more quickly fill the storage tank 16 with nutrients. However, in other embodiments the cap 34 may be omitted, and the storage tank 16 may be a unitary construction.

Figure 5:
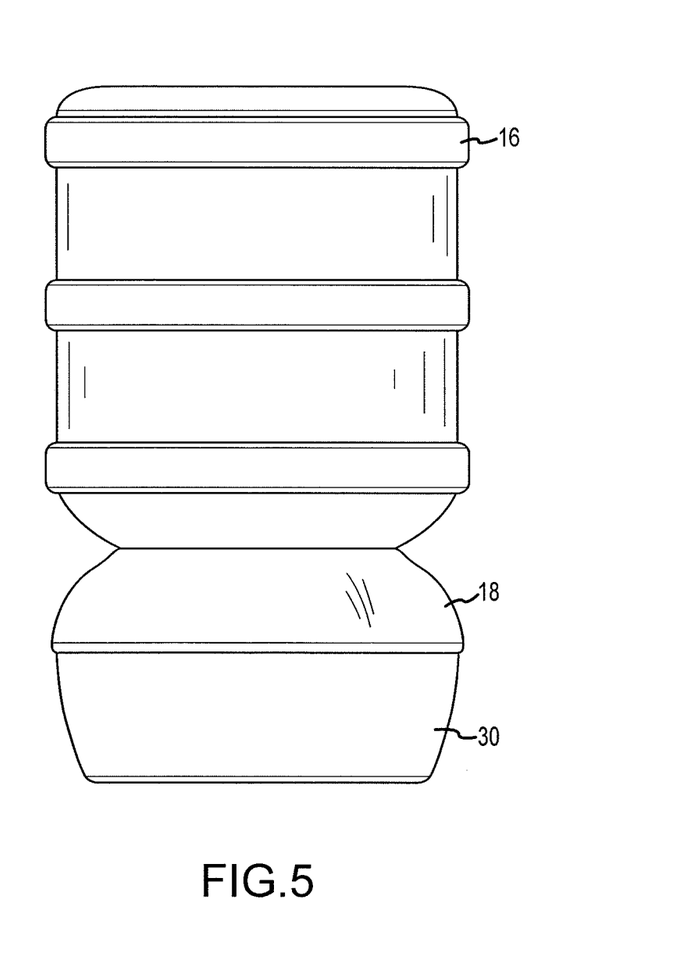
FIG. 5 is a rear elevation view of the nutrient dispensing system.

Referring now to FIGS. 1 and 10, the base 11 may be covered with a collar 18 and a rim 14. The collar 18 may resist nutrients from spilling or splashing when traveling from the storage tank 16 to the base 11. As discussed above, the storage tank 16 may attach to the collar 18, in some embodiments the storage tank 16 may be securedly attached via the threading 44 or other securing method. The collar 18 may be permanently attached to the base 11. For example, the collar 18 and the base 11 may be formed separately but may be unable to be detached from one another once the collar 18 and the base 11 are secured together. However, in other embodiments, the collar 18 may be removable from the base 11. The collar 18 may also help to avoid animals accessing the neck 44 of the storage tank 16, as well as provide a more refined appearance as the internal connections between the base 11 and the storage tank 16 may be substantially hidden from view. The collar 18 may sit above the supporting portion 30 of the base 11 and may be configured in some embodiments to be secured to the supporting portion 30 via securing apertures 70 located along a perimeter of the supporting portion 30 and securing taps 71 located at a bottom end of the collar 18. Additionally, in some embodiments, the collar 18 may be partially disposed inside an area of the supporting portion 30. Additionally, as can be seen from FIGS. 8 and 10, the collar 18 may rest along extensions 65 spaced along an inner wall of the supporting portion 30. The collar 18 may include a depression 51 running along a portion of the back end, such that the collar 18 may snap fit onto the supporting portion 30. In some embodiments, as illustrated in FIG. 5, there may be a substantially seamless-appearing fit between the collar 18 and the supporting portion 30.

The rim 14 may also attach to a top portion of the base 11. The rim 14 may be integrally formed with the collar 18, such that the collar 18 and the rim 14 form a single piece, however in other embodiments the rim 14 and the collar 18 may form two distinct pieces. The rim 14 may be attached to the base 11 by securing apertures 70. For example, in some embodiments, the rim 14 may include securing tabs 22 that may be inserted within the securing apertures 70. Also, in some embodiments, the rim 14 may sit above the wall 24, however in other embodiments portions of the rim 14 may sit below the top end of the wall 24. For example, the wall 24 may include a recess or the like that may receive a portion of the rim 14 beneath the top end. The collar 18 may also be formed integrally with the rim 14 or may be formed of distinct pieces.

Figure 8:
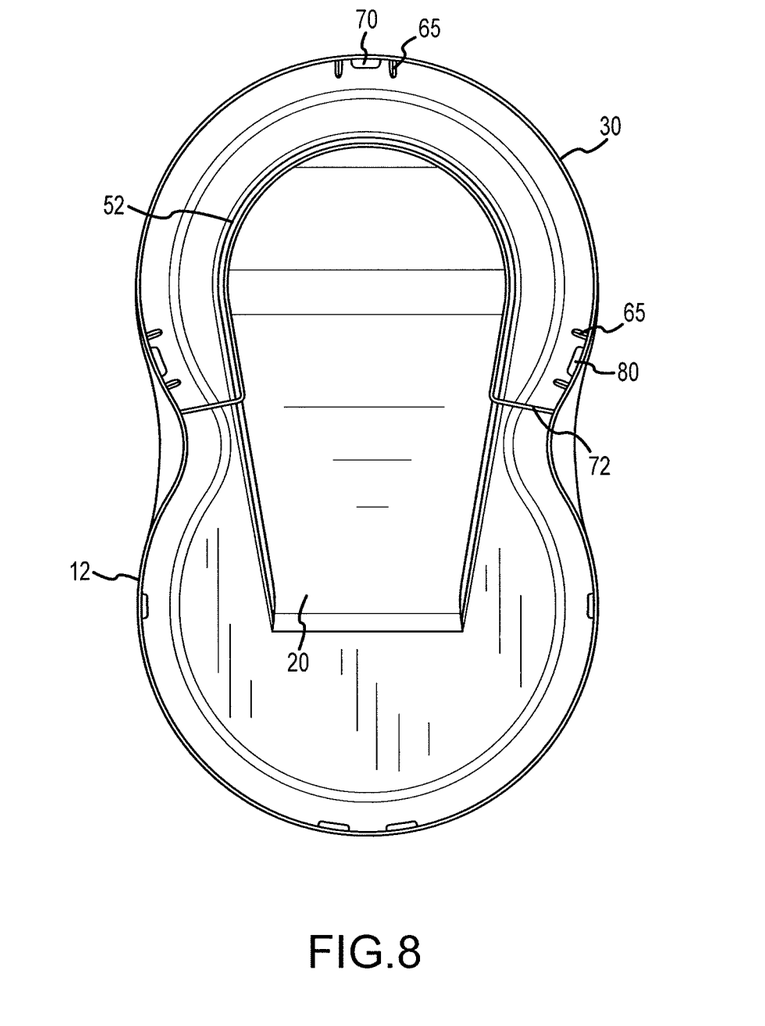
FIG. 8 is another top view of the base of the nutrient dispensing system.

FIGS. 7 and 8 illustrate the supporting portion 30 of the base 11. The supporting portion 30 of the base 11 supports the storage tank 16 on top of the base 11. The supporting portion 30 may include a supporting wall 76 that supports the ramp 20, an inner wall 78 and a lip 82 surrounding a bottom portion of the inner wall 78. The inner wall 78 may include receiving tabs 80 that may be used to help secure the collar 18 to the base. Similarly, extensions 65 may extend from the inner wall 78 to further support the collar 18. The combination of the inner wall 78, the supporting wall 76, and the back shield 52 may form a channel or hollow space. These embodiments allow the dispensing device 10 to weigh less, while still resisting nutrients from getting trapped behind the ramp 20 or in other areas that may be inaccessible to animals.

Figure 4:
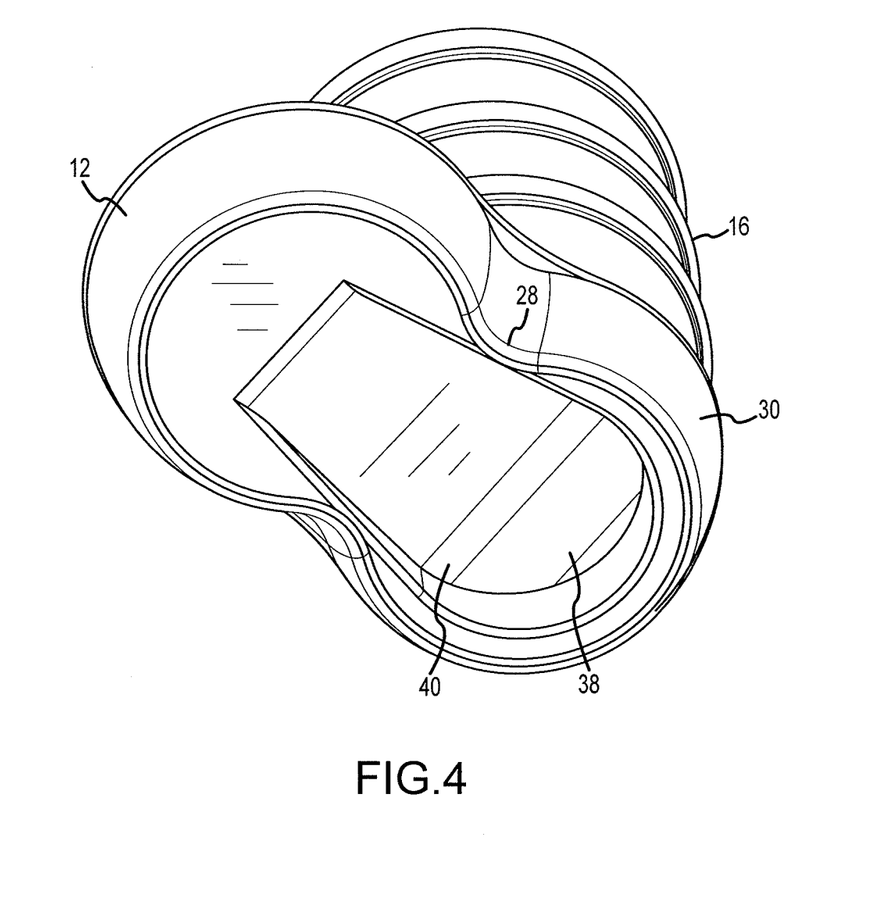
FIG. 4 is a bottom view of the nutrient dispensing system.

Referring briefly to FIGS. 4 and 9, in some embodiments the support portion 30 may be raised up and be substantially hollow underneath the ramp 20, this allows the base 11 to be light weight. However, in other embodiments the support portion 30 may be solid. The support portion 30, the shields 52, 72 and the ramp 20 may be molded as an integrated piece. The collar 18 then may be formed as a piece that is separate from the support portion 30 and the access bin 12, and the collar 18 then may be connected, removably or permanently, to the base 11 after the collar 18 has been formed. These embodiments can reduce potential issues with the molding or forming process. As the support portion 30 may be substantially hollow and the collar 18 may be a separate piece, the molds for the dispensing device 10 may be simpler than other unitary designs, and may resist breaking as easily as other animal feeding devices. Furthermore, these embodiments may reduce the cooling time for the molding process, and a reduction in cooling time may significantly decrease the cost and time of the construction process, as in some embodiments the cooling time requires most of the time in the manufacturing process.

The foregoing describes some example embodiments to achieve a continuous water filtration watering system for animals. Although the present invention has been described with reference to illustrated embodiments, persons skilled in the art will recognize that changes may be made in form and detail without departing from the spirit and scope of the invention. Indeed, in other embodiments, the dispenser design may be used in other applications besides pet feeding and watering devices, for example in human food/water storage. Furthermore, it should be appreciated that other components may be added to the dispenser. For example, a pump may be used to circulate fluid within the access basin 12 or to pump water from the storage tank 16 into the access basin 12. Accordingly, the specific embodiments described herein should be understood as examples and not limiting the scope of the disclosure.

What is claimed is:

1. A nutrient dispenser for animals, comprising:
   a base having an access basin and a support portion disposed adjacent the access basin, said support portion further comprising:
   a perimeter wall extending vertically from an outer edge of a bottommost surface of the support portion, and
   a supporting wall spaced from the perimeter wall of the support portion and extending vertically from an inside edge of the bottommost surface of the support portion,
   wherein the bottommost surface of the support portion connects the perimeter wall and the supporting wall of the support portion defining an upwardly facing channel extending between and connecting the perimeter wall to the supporting wall of the support portion;
   a ramp extending longitudinally between the support portion and the access basin from a first end of the ramp to a second end of the ramp, the ramp having a maximum height that is substantially the same as a maximum height of the supporting wall;
   a storage tank configured to be disposed on the support portion to create a space between the storage tank and the ramp, the first end of the ramp being located adjacent an open end of the storage tank, the first end of the ramp and the open end of the storage tank being separated by the space; and
   at least one back shield comprising at least a portion of the back shield disposed adjacent at least a portion of the ramp, and at least a portion of the back shield that is adjacent to the support portion extends vertically from a topmost portion of the supporting wall, the back shield defining a barrier separating the access basin and the support portion to resist contents stored in the storage tank from entering the upwardly facing channel of the support portion, the back shield being substantially a continuously flat surface.

2. The nutrient dispenser of claim 1, wherein the first end of the ramp is at least partially planar, the ramp sloping in a downward direction from the first end to the second end.

3. The nutrient dispenser of claim 2, wherein the second end of the ramp is disposed on a bottom surface of the access basin, the ramp being oriented at an angle having a range of approximately 20 to 25 degrees between the bottom surface of the access basin and the first end of the ramp.

4. The nutrient dispenser of claim 1, further comprising a collar surrounding at least a portion of the storage tank and detachably disposed on the support portion.

5. The nutrient dispenser of claim 4, wherein the collar is a separate piece from the support portion and is substantially immovable when attached to the support portion.

6. The nutrient dispenser of claim 1, wherein the access basin and the support portion are substantially semi-circular and are configured to be attached together to form a base structure of the nutrient dispenser having a substantially figure eight shape.

7. The nutrient dispenser of claim 1, further comprising a wall attached to a perimeter of the access basin and being configured to contain nutrients inside the access basin.

8. The nutrient dispenser of claim 7, further comprising a rim attached to a top portion of the wall and a base structure of the nutrient dispenser, the base structure comprising the access basin and the support portion.

9. The nutrient dispenser of claim 1, wherein the second end of the ramp is disposed on a bottom surface of the access basin, the ramp further having a pair of lateral sides disposed between the first and second ends, the lateral sides being elevated above the bottom surface of the access basin adjacent the second end of the ramp.

10. The nutrient dispenser of claim 1, wherein the storage tank has an adjustable neck disposed at a bottom portion of the storage tank, the neck having a passageway configured to enable passage of nutrients between the storage tank and the access basin.

11. The nutrient dispenser of claim 10, wherein the neck of the storage tank is spaced from the ramp.

12. The nutrient dispenser of claim 1, wherein the at least one back shield extends from the supporting wall to be disposed between the storage tank and the support portion when the nutrient dispenser is assembled.

13. A nutrient dispenser for animals, comprising:
- a base having an access basin and a support portion disposed adjacent the access basin, said support portion further comprising:
  - a perimeter wall extending vertically from an outer edge of a bottommost surface of the support portion, and
  - a supporting wall spaced from the perimeter wall of the support portion and extending vertically from an inside edge of the bottommost surface of the support portion,
  - wherein the bottommost surface of the support portion connects the perimeter wall and the supporting wall of the support portion defining an upwardly facing channel extending between and connecting the perimeter wall to the supporting wall of the support portion;
- a ramp extending between the support portion and the access basin from a first end of the ramp to a second end of the ramp;
- a storage tank configured to be disposed on the support portion to create a space between the storage tank and the ramp, the ramp being located directly below an open end of the storage tank with the first end of the ramp being located adjacent the open end of the storage tank, the first end of the ramp and the open end of the storage tank being separated by the space;
- a collar disposed between the storage tank and the support portion, the collar being detachably attached to the storage tank and being detachably disposed on the support portion when the dispenser is in the assembled state; and
- at least one back shield comprising at least a portion of the back shield disposed adjacent at least a portion of the ramp, and at least a portion of the back shield that is adjacent to the support portion extends vertically from a topmost portion of the supporting wall, to resist contents stored in the storage tank from entering the upwardly facing channel of the support portion.

* * * * *